March 23, 1965 E. L. STAIGER ETAL 3,174,363
METHOD OF FORMING CUTTING TOOLS
Filed Nov. 8, 1961
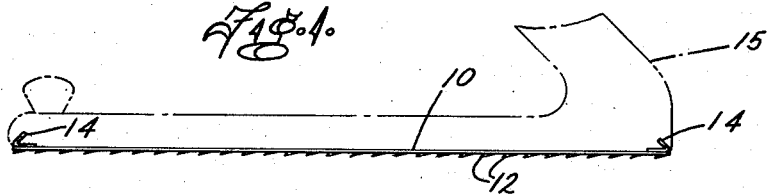
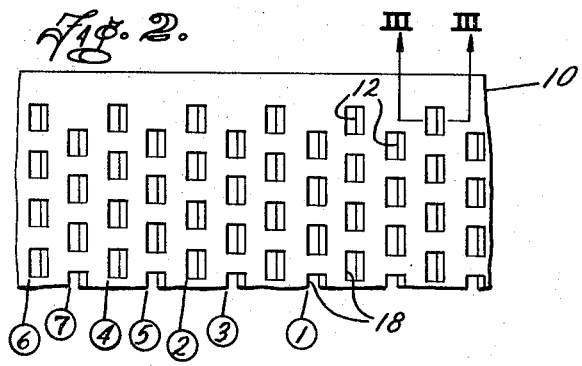
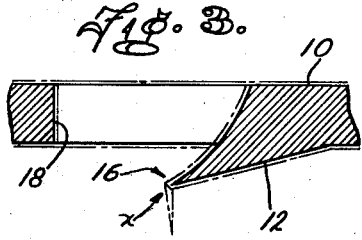
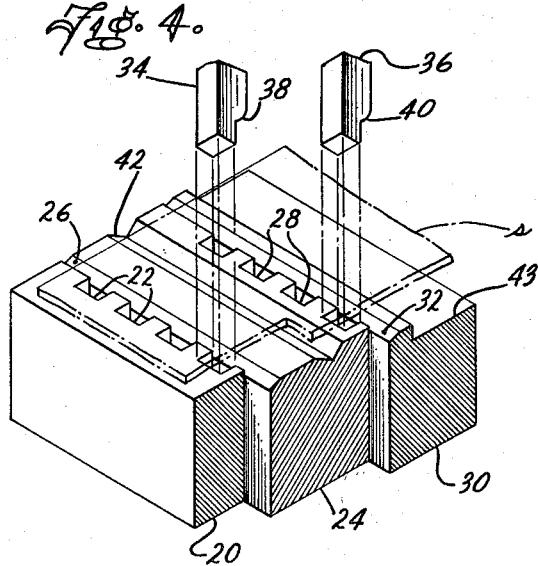
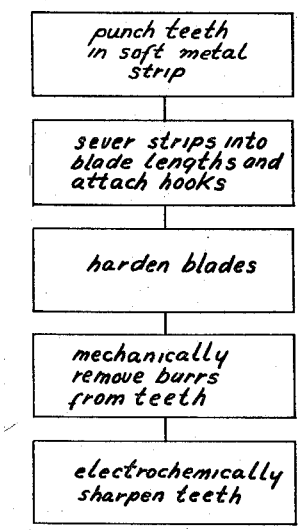
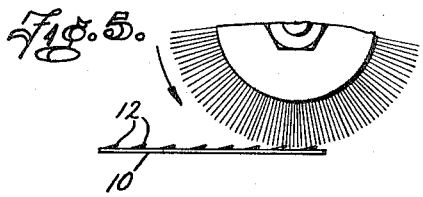
INVENTORS
Eugene L. Staiger
Paul F. Lyman
BY Chapin + Neal
Attorneys 3,174,363
METHOD OF FORMING CUTTING TOOLS
Eugene L. Staiger and Paul F. Lyman, both of Greenfield, Mass., assignors, by mesne assignments, to Millers Falls Company, Greenfield, Mass., a corporation of Massachusetts
Filed Nov. 8, 1961, Ser. No. 150,986
4 Claims. (Cl. 76—24)

The present invention relates to improvements in the manufacture of multi-tooth tools for removing shavings from wooden workpieces or the like, and in certain aspects relates to the sharpening of cutting edges, wherein utility is not limited to any particular tool.

In recent years flexible sheet metal blades have come into fairly widespread use for removing material from wood, soft metal and other workpieces in the same fashion as a plane or wood rasp. These blades are mounted in a frame or holder and have a plurality of openings therethrough with a tooth defining the rear side of each opening. The open work character and the plurality of teeth on these blades has proven effective in quickly removing wood or the like to shape workpieces.

The blades referred to have the disadvantage of requiring a rather delicate "touch" in their use. That is, if too much pressure is applied, the blade will tend to dig into the workpiece and stall, and if too little pressure is applied, the blade will skid over the surface of the workpiece removing little or no material.

One object of the invention is to provide an improved blade which will effectively remove material when a wide range of pressures are applied thereto and thus minimize or eliminate the fatigue which results from a constant effort to apply a critical pressure in removing material.

The techniques for manufacturing these blades have been relatively complicated and critical, resulting in a fairly substantial cost which has limited their use. Accordingly another object of the invention is to reduce the cost of and simplify the manufacture of multi-tooth blades.

In attaining these ends each opening in the blade and the tooth at that opening are formed simultaneously by novel punch and die mechanism which advantageously forges the ends of the teeth for greater strength and also forms a concavity in the upper surface of each tooth. The teeth, as formed by the punch and die mechanism, do not necessarily have an effective cutting edge. It is, therefore, preferred that these teeth be economically and efficiently sharpened by an electro-chemical process later described in detail. It is this sharpening process which may also be employed to sharpen the cutting edges of other tools.

The above and other related objects and features of the invention will be apparent from a reading of the following description of the disclosure found in the accompanying drawing and the novelty thereof pointed out in the appended claims.

FIG. 1 is an elevation of a cutting tool blade embodying the present invention with one type of frame or holder therefor indicated by phantom lines;

FIG. 2 is a fragmentary plan view of the blade, on an enlarged scale;

FIG. 3 is a section, on a further enlarged scale taken on line III—III in FIG. 2;

FIG. 4 is a perspective view of a punch and die assembly used in forming the blades of the present invention;

FIG. 5 is a view illustrating the method step of mechanically removing burrs from the tool blade; and FIG. 6 is a block diagram of the steps employed in forming this blade.

Referring first to FIG. 1, the blade 10 of the present invention comprises an elongated strip of sheet material having teeth 12 which project from the lower surface thereof. Hooks 14 may be secured to opposite ends of the blade 10 and provide for its attachment, in a known manner, to a frame or holder member 15 indicated in phantom outline. The illustrated frame is adapted to be gripped and used in the same general manner as a hand plane. It will be apparent to those skilled in the art that other types and styles of holders could also be employed in using this blade.

The teeth 12 each have a cutting edge at 16 (FIG. 3) disposed below the lower surface of the blade, each tooth defining the rear of an opening 18. Preferably the lower surface of a tooth is substantially flat, while the upper surface thereof down to the cutting edge 16 is concavely curved and there approximates a tangential relation to the lower surface at edge 16. Teeth 12 and openings 18 are aligned in rows disposed transversely of the blade, the teeth in adjacent rows being staggered. Also, it may be noted the width of the teeth is greater than the spacing between adjacent teeth in each row in order to have an uninterrupted cut in a workpiece surface.

The blade is highly effective in removing material such as shavings and the like from a wood workpiece when the blade is held in a frame of the type indicated in FIG. 1. In use there is no particular criticality to the amount of pressure applied to the blade. That is, there is effective removal of material over a wide range of pressures, with the amount removed being directly proportional to the pressure applied. The cutting edges 16 are particularly characterized by their long life and the effectiveness with which large amounts of material can be removed. The open-work character of the blade provided by the openings 18 permits the rapid removal of large amounts of the workpiece without danger of clogging and need for frequent cleaning. A further feature is the smoothness of the finish produced on a workpiece.

The blade is initially formed in a punch and die assembly such as that shown by FIG. 4. The die portion is preferably formed by a block 20 having a series of three-sided vertical grooves 22 formed in one side thereof. A second block 24 is mounted adjacent the block 20, closing off the open sides of grooves 22 and forming die openings having an outline to provide the openings 18 in the blade 10. Upper flat top surfaces of the blocks 20 and 24 lie in a common plane while block 24 has a beveled surface 26 which extends upwardly from grooves 22 to its flat top surface. Block 24 at its opposite side is provided with grooves 28 similar to grooves 22 which, in combination with a third block 30, define a second set of die openings having the same configuration as the openings 18 of blade 10 and which are laterally staggered relative to grooves 22. This second set or row of openings is spaced from the first described row a distance equal to the spacing between four rows of openings 18 as seen in the blade of FIG. 2. Block 30 also has a beveled surface 32 which extends upwardly from the grooves 28 to an upper flat top surface portion which lies in the same plane as the flat top surfaces of blocks 20 and 24.

Two sets of punches 34 and 36 (only one of each being shown) are provided for cooperative action with the die openings defined by the grooves 22 and 28 and the opposed beveled surfaces respectively. The action of all of the punches 34 and 36 is identical in that they punch out openings in a ribbon or strip of sheet metal $s$ which is fed over the blocks 20, 24 and 30. As each punch advances towards and into a groove 22 or 28 aligned therebeneath, it makes a three-sided cut in the strip $s$. Continued downward movement of the punches pushes or draws the cut sheet material of strip $s$ downwardly against the beveled surfaces 26 and 32, respectively. Thus the openings 18 are created and the teeth 12 are formed as the tips of each punch 34 or 36 continue below said beveled surfaces to thereby cut away the fourth side of a knock out piece or plug (not shown) which falls through to the bottom of the groove 22 or 28.

Further movement of the punches causes the shoulders at 38 and 40 formed respectively thereon, to swage or cold forge the metal forming the cutting edges 16 of the teeth. The metal, marginal to the cutting edges, is actually cold worked in forming the concavity on the upper side of each tooth. It will further be noted that the shoulders 38 and 40 are convexly curved to form this concavity. When bottomed against the lower edges or corners of the bevel surfaces 26 and 32 the shoulders have substantially a tangential relation therewith.

After the punches 34 and 36 have formed teeth in the fashion just described, they are retracted and the strip $s$ advanced a distance equaling the distance between two rows of teeth for the next operation of the punches. Thus, for example, in the first downward movement of the punches 34 and 36 (see FIG. 2), the rows marked ① and ② would be formed. After the strip $s$ is advanced, the teeth in row ② will be disposed in a groove 42 formed in the block 24, while the teeth in row ① will be advanced to the recessed portion at 43 in block 30. When the punches 34 and 36 are brought down a second time, rows ③ and ④ will be formed. In the next two cycles of operation of the punches 34 and 36, rows ⑤ and ⑥ and ⑦ and an 8th row (not shown) will be formed and so on. Thus, the rows of teeth 12 may be continuously formed in the strip $s$ in a simple, rapid fashion and with a minimum of expense. Movements of the punches 34 and 36 and strip $s$ are controlled by advancing means obvious to those skilled in the art.

The strip $s$ is preferably fed as an endless length from a large supply roll and in a preferred form is about .023 inch in thickness as described above. In forming the teeth 12 by the punch and die operation it has been found that a depending flash or burr is usually left on each cutting edge 16 as indicated by the exaggerated phantom showing in FIG. 3.

When present, this burr must be removed and a further sharpening process performed to obtain a sharp and keen cutting edge 16. It is also usual to form the teeth 12 while the strip $s$ is in a soft or annealed condition, so that a hardening operation would also usually be required.

Preferably and in accordance with certain aspects of the invention these hardening and sharpening operations are performed in the manner now to be described in connection with the method steps shown in FIG. 6.

The composition of the strip from which the blades are made is advantageously an inexpensive low carbon steel such as SAE 1010, though other materials could be employed as will later be pointed out.

After the teeth 12 are formed by the punching operation, the strip $s$, if in continuous form, may be conveniently severed into suitable lengths as desired for individual blades 10. Hooks 14 are then added by resistance welding or other appropriate means. These steps of severing the blade lengths and adding the hooks need not necessarily follow the tooth forming step. They could, if desired, be performed following any of the subsequent steps outlined in FIG. 6.

The next step is to harden the material and provide in at least the outer skin (.003″ to .007″ in depth) both carbides and nitrides. Preferably this is done by a carbo-nitriding process. Specifically, the blades 10 were introduced into a controlled atmosphere furnace for 45 minutes at a temperature of 1450° F. The atmosphere in the furnace comprised 40% $H_2$, 40% $N_2$, and 20% CO enriched with .35% propane and .75% ammonia. After removal from the furnace the blades 10 were then oil quenched to room temperature. The hardened case on the blades was approximately .005″ thick with a hardness of 60–62 Rockwell C as converted from Knoop hardness readings.

The burrs on the edges 16 are now hardened through their thickness and are readily removed by passing the blades 10 beneath a relatively stiff wire brush wheel as indicated in FIG. 5. The burrs are fractured on a line indicated generally at $x$ in FIG. 3. It will be apparent from FIG. 3 that the tooth 12 after removal of the burr does not possess a satisfactory or efficient cutting edge as shown by the phantom outline. The fractured region is relatively rough and ragged and provides nothing more than a blunt cutting edge.

The next step is to sharpen the plurality of cutting edges on each blade by an electro-chemical process as will now be described. The blades are immersed in an electrolyte and are connected as the anode of a direct current electrical circuit of the type normally used in an electro-etching process. A lead cathode is also connected to the electrical circuit and likewise immersed in the electrolyte.

Broadly speaking the electrolyte comprises an aqueous salt solution and a strong mineral acid. Sufficient current density is provided to obtain anodic polarization of the workpiece. When this is done metal is selectively removed (as indicated in FIG. 3) from the teeth to form a keen cutting edge 16 on each tooth 12. Usually the state of anodic polarization can be detected by a drop in current density. Thereafter the blades are removed from the electrolyte, rinsed in a water bath and then "blued" or "blackened" by further chemical treatment and also to obtain some corrosion resistance as in the case of a phosphate coating. It is to be understood, of course, that this last step is optional and that the blades would be ready for use after rinsing.

The electrolyte may be further characterized by an aqueous acid solution containing both sulphate and chloride ions.

In another aspect the electrolyte may be characterized by the presence of an acid selected from the group consisting of hydrochloric acid and sulfuric acid and a salt selected from the group consisting of sulfate salts and chloride salts. Preferably this electrolyte contains both sulfate ions and chloride ions.

In a more specific sense the electrolyte preferably contains both sulfate ions and chloride ions with an acid being selected from the group consisting of hydrochloric acid and sulfuric acid and a salt selected from the group consisting of sodium chloride, potassium chloride, ammonium chloride, nickel chloride, calcium chloride, ferric chloride, nickel sulfate, copper sulfate, magnesium sulfate, ammonium sulfate, manganese sulfate, sodium sulfate, potassium sulfate and ferric surfate. The direct current potential applied to the workpiece is between 3 and 15 volts. The initial current density is between 425 and 900 amperes per square foot with a drop of 50 to 350 amperes per square foot being observed when the above mentioned anodic polarization occurs. The workpieces are removed from the electrolyte after an immersion time of 1.25 to 3 minutes. Following the water bath the workpieces are ready for use.

The preferred concentration of the salts listed immediately above ranges from ½ pound per gallon up to saturation while the concentration of acid ranges between .1% and .55% of hydrogen based on weight of the salt solution, with the upper limit of acid concentration not being particularly critical.

It is also advantageous to include in the electrolyte a small amount of surfactant to create a foam blanket which minimizes the escape of fumes and vapor generated during the sharpening process. Such use of surfactants is known per se to those skilled in the art.

In each of the following examples the procedures followed were substantially the same insofar as:

(a) Teeth were formed on blades by the punch and die apparatus previously described, (b) The blades were hardened by carbo-nitriding essentially as set forth and burrs removed from the teeth by using a wire wheel, (c) A blade or portion of a blade was immersed in an electrolyte and connected as the anode in a direct current electric circuit, (d) Measurements were made of the starting and final current density, the voltage potential (which remained substantially constant) on the blade, and the time of immersion, (e) The effectiveness of the sharpening action observed by naked eye, magnifying glass and ground sections observed under a microscope with up to 400X magnification. Using a ten power magnifying glass, the effectiveness of the sharpening action was classified as: fair, where there was a definite reduction in the blunt edge on the tip of the tooth (as at $x$ in FIG. 3); good, where no discrete edge could be observed; and excellent where the edge came to a sharp point. The accuracy of these observations was also verified by using the blades to remove shaving from workpieces.

(f) It was also observed that the amount of metal removed from all surfaces of the blades was in the order of .001–.002 in.

EXAMPLES

| Example | Salt | Salt Concentration, #/gal. | Acid | Acid Concentration, percent/vol. | Voltage | Current Density, Amps/sq.ft. (Start) (Finish) | Time, min. | Results |
|---|---|---|---|---|---|---|---|---|
| I | NaCl | 1 | HCl * | 5 | 12 | 750 / 650 | 2 | Fair. |
| II | NaCl | 1 | HCl * | 50 | 8.5 | 800 / 600 | 2 | Good. |
| III | NaCl | 2 | H₂SO₄ ** | 10 | 8.5 | 600 / 500 | 2 | Excellent. |
| IV | FeCl₃ | 1.4 | H₂SO₄ | 15 | 9.5 | 550 / 275 | 2 | Do. |
| V | KCl | 2 | H₂SO₄ | 10 | 6.5 | 550 / 450 | 2 | Do. |
| VI | KCl | 2 | HCl | 10 | 9 | 550 / 450 | 2 | Fair. |
| VII | CaCl | 1 | HCl | 10 | 12 | 750 / 760 | 2 | Do. |
| VIII | NH₄Cl | 2 | H₂SO₄ | 10 | 12 | 800 / 600 | 2 | Good. |
| IX | NiCl₂ | 2 | H₂SO₄ | 10 | 7.5 | 650 / 450 | 2 | Do. |
| X | NiSO₄ | 1.4 | HCl | 20 | 7 | 650 / 475 | 1.4 | Excellent. |
| XI | CuSO₄ | 2 | HCl | 10 | 16.5 | 575 / 500 | 1.5 | Do. |
| XII | MgSO₄ | 1.75 | HCl | 10 | 17.5 | 575 / 425 | 1.5 | Do. |
| XIII | (NH₄)SO₄ | 2 | HCl | 10 | 13.5 | 600 / 400 | 1.5 | Do. |
| XIV | MnSO₄ | 2 | HCl | 10 | 13.5 | 500 / 400 | 1.5 | Do. |
| XV | Na₂SO₄ | .75 | HCl | 10 | 12.5 | 650 / 500 | 1.5 | Do. |
| XVI | K₂SO₄ | 2 | HCl | 10 | 10 | 650 / 450 | 1.5 | Do. |
| XVII | Fe₂(SO₄)₃ | 1.8 | HCl | 10 | 15 | 625 / 475 | 1.5 | Do. |

* 20° Baumé.   ** 66° Baumé.

Of the various examples set forth above the sodium chloride-sulfuric acid electrolyte of Example III is to be preferred because of the economy and ease of employing these particular compounds and the excellent results obtained thereby. It was also found that the steps followed in this example gave a broader range of working conditions while yielding consistently effective sharpening of the cutting edges.

While the inventive concepts herein involve a process for forming a blade and electro-chemically sharpening a plurality of teeth, the sharpening process per se is actually limited to steel workpieces having carbides and nitrides in at least their outer skin portions (.003 to .007 in. in depth). So far as can be determined it is immaterial how the carbides and nitrides are created in the workpieces. The blades may therefore be formed of any material from which this structure may be obtained. On the other hand, carbide bearing workpieces without nitrides, failed to show any evidence of sharpening when treated in accordance with the examples given above.

Having thus described the invention what is claimed as novel and desired to be secured by Letters Patent of the United States is:

1. The method of forming cutting tool blades comprising the steps of punching a plurality of openings in an elongated soft steel workpiece, and simultaneously forming a depending tooth having a cutting edge defining one side of each opening and wherein the cutting edge is characterized by the presence of burrs projecting therefrom, thereafter carbo-nitriding the workpiece to provide a hardened surface thereon with nitrides in the outer skin portions thereof, mechanically fracturing the burrs to remove them from the cutting edges, immersing the workpieces in an electrolyte having sulfate ions and chloride ions provided by selecting an acid from the group consisting of hydrochloric acid and sulfuric acid, and salt selected from the group consisting of sodium chloride, calcium chloride, ferric chloride, potassium chloride, ammonium chloride, nickel chloride, nickel sulfate, copper sulfate, magnesium sulfate, ammonium sulfate, manganese sulfate, sodium sulfate, potassium sulfate, and ferric sulfate, and passing a direct electric current through the electrolyte with the workpiece serving as an anode, with the initial current density ranging from between 425 and 900 amperes per square foot, maintaining the workpiece in the electrolyte for a period of from 1 to 3 minutes, then removing the workpiece and rinsing it in water after a sufficient amount of metal has been removed to provide keen cutting edges on said teeth.

2. The method of claim 1 wherein the acid is sulfuric acid and the salt is sodium chloride, and the concentration of salt is 2 lbs. per gallon and the concentration of acid is 10% by volume of the salt solution.

3. The method of forming cutting tool blades comprising the steps of forming a plurality of openings in a soft steel strip with a cutting edge at the rear of each opening, each opening being formed by projecting a punch through said strip and into a corresponding die opening thereunder and with the same motion of the punch displacing a tooth forming portion of the strip below the plane thereof and forming a cutting edge at the lower end of the displaced portion, and simultaneously forging said tooth forming portion to obtain a concave surface in the upper portion of the tooth leading from the cutting edge, wherein the cutting edges are characterized by the presence of burrs projecting therefrom, severing the steel strip into blades of finite length, thereafter carbon-nitriding the workpiece to provide a hardened surface thereon with nitrides in the outer skin portions thereof, mechanically fracturing the burrs to remove them from the teeth, immersing the blades in an electrolyte comprising a strong mineral acid and a salt, and passing electrical current through the electrolyte with the workpiece serving as an anode, the current density being sufficient to cause a polarized anodic film on the workpiece and selectively remove metal from the blade and particularly the teeth thereof, removing the blade from the electrolyte and rinsing it in water after a sufficient amount of metal has been selectively removed to sharpen said teeth.

4. The method of forming cutting tool blades comprising the steps of punching a plurality of openings in an elongated, soft steel workpiece, and forming a depending tooth having a cutting edge defining one side of each opening, and wherein the cutting edges are characterized by the presence of burrs projecting therefrom, thereafter carbo-nitriding the workpiece to provide a hardened surface thereon with carbides and nitrides in the outer skin portions thereof, mechanically fracturing the burrs to remove them from the cutting edges, immersing the workpiece in an electrolyte comprising an acid selected from the group consisting of hydrochloric acid and sulfuric acid, and a salt selected from the group consisting of sulfate salts and chloride salts and passing electrical current through the electrolyte with the workpiece serving as an anode, the current density being sufficient to cause a polarized anodic film on the workpiece to selectively remove metal from the workpiece and form keen cutting edges on the tips of said piece, and then removing the workpiece after a sufficient amount of metal has been removed therefrom, and then rinsing the workpiece in water.

References Cited by the Examiner
UNITED STATES PATENTS

| | | | |
|---|---|---|---|
| 660,604 | 10/00 | Turner | 76—13 |
| 673,367 | 4/01 | McHardy | 76—13 |
| 1,721,414 | 7/29 | Robe | 76—24 |
| 2,820,281 | 1/58 | Amsen | 29—78 |
| 2,823,562 | 2/58 | Humbarger | 76—24 |
| 2,897,692 | 8/59 | Beckner | 76—24 |
| 2,984,892 | 5/61 | Oxford et al. | 29—78 |
| 3,077,127 | 2/63 | Stutzke et al. | 76—24 |

GRANVILLE Y. CUSTER, JR., *Primary Examiner.*
WILLIAM W. DYER, JR., *Examiner.*